United States Patent [19]

Koroscil

[11] Patent Number: 4,698,183
[45] Date of Patent: Oct. 6, 1987

[54] HIGH LIGHT OUTPUT-SHORT DURATION CHEMILUMINESCENT COMPOSITIONS

[75] Inventor: Anthony Koroscil, Escambia, Fla.

[73] Assignee: American Cyanamid Company, Stamford, Conn.

[21] Appl. No.: 826,052

[22] Filed: Feb. 4, 1986

[51] Int. Cl.<sup>4</sup> ...................... C09K 11/00; C07D 233/02
[52] U.S. Cl. .................................... 252/700; 548/300; 252/582; 427/157
[58] Field of Search ................ 252/700, 582; 548/300; 427/157

[56] References Cited

U.S. PATENT DOCUMENTS

| | | | |
|---|---|---|---|
| 3,749,679 | 7/1973 | Rauhut | 252/700 |
| 3,816,326 | 6/1974 | Bollyky | 252/700 |
| 3,948,797 | 4/1976 | Vega | 252/700 |
| 3,974,368 | 8/1976 | Rauhut | 252/700 X |
| 3,994,820 | 11/1976 | Maulding et al. | 252/700 |
| 4,002,591 | 1/1977 | Gangneux | 524/720 X |
| 4,017,415 | 4/1977 | Doering | 252/700 |
| 4,064,064 | 12/1977 | Rauhut et al. | 252/700 |
| 4,076,645 | 2/1978 | Vega | 252/700 |
| 4,089,836 | 5/1978 | Gangneux | 524/90 |
| 4,191,680 | 3/1980 | Wegmann et al. | 524/556 X |
| 4,366,079 | 12/1982 | Rauhut et al. | 252/700 |
| 4,372,745 | 2/1983 | Mandle et al. | 252/700 X |
| 4,379,320 | 4/1983 | Mohan et al. | 252/700 |
| 4,401,585 | 8/1983 | Arther, Jr. et al. | 252/700 |
| 4,407,743 | 10/1983 | Tseng | 252/700 |
| 4,462,931 | 7/1984 | Cohen | 252/700 |
| 4,547,317 | 10/1985 | Kamhi | 252/700 |
| 4,626,383 | 12/1986 | Richter et al. | 252/700 |
| 4,640,193 | 2/1987 | Koroscil | 252/700 X |

FOREIGN PATENT DOCUMENTS 1222190  11/1965  Fed. Rep. of Germany ... 252/188.7

Primary Examiner—John F. Terapane
Assistant Examiner—Catherine S. Kilby
Attorney, Agent, or Firm—Frank M. Van Riet

[57] ABSTRACT

Novel activator and oxalate compositions are disclosed which, when combined, result in a chemiluminescent light of high light output and short duration.

15 Claims, No Drawings

HIGH LIGHT OUTPUT-SHORT DURATION CHEMILUMINESCENT COMPOSITIONS

BACKGROUND OF THE INVENTION

In the commercial production of chemiluminescent light devices which are used as emergency sources or for aesthetic purposes etc, the prime concern is that the light be strong enough for a particularly desired duration. The usual criteria is that the duration of the light range from about 5 to about 12 hours without becoming so dim so as to lose its effectiveness.

At the other end of the spectrum is the need for light of a high intensity and a short duration. Usually the requirement is for an intensity of at least output 100 foot lamberts and a duration of from about 5 to 15 minutes. Light of this type is most commonly required for emergency or military uses such as, for example, flares. Explosive devices account for most of the production of these systems, however, because of the explosion, they, being pyroforic, optimes cause undersirable side-effects such as brush fires, etc. It has therefore become apparent that there is a need for non-pyroforic devices which emit a strong light for a short duration and if such could be devised, a long-felt need would be satisfied.

SUMMARY OF THE INVENTION

A novel activator composition and a novel oxalate composition have now been found, which compositions, when admixed together, for a chemiluminescent light of high intensity and short duration. The activator composition comprises a mixture of two salicylate catalysts in critical concentrations whereas the oxalate composition comprises a critical admixture of an oxalate and a fluorescer, also in critical concentrations.

DESCRIPTION OF THE INVENTION INCLUDING PREFERRED EMBODIMENTS

The novel compositions of the present invention are useful in the production of chemical light devices of the kind comprising a liquid chemiluminescent mixture in a transparent or translucent container. They may be used in chemical lightsticks of the kind comprising an outer flexible sealed tube containing one of the novel compositions hereof separated by frangible means such as a glass vial or the like inside the tube and containing the other of the novel compositions hereof. By bending the tube, the frangible means is broken causing its composition to admix with the other composition in the tube and thereby from a chemiluminescent mixture which emits light through the walls of the tube. Typically, one of the compositions is an enhancer composition composed of a catalyst, hydrogen peroxide and a solvent while the other composition is an oxalate composition comprising an oxalate, a fluorescer and a solvent.

The instant invention resides in a novel activator composition and a novel oxalate composition which, when admixed, form a chemiluminescent light of high light intensity and short duration. By "high light intensity", as used herein, is meant a light intensity of at least about 100 foot lamberts and by "short duration", as used herein, is meant from about 5 to about 15 minutes.

The novel activator composition of the present invention which produces chemiluminescent light of high light intensity and short duration when admixed with the novel oxalate composition of the present invention, comprises a solvent solution of hydrogen peroxide and a mixture of from about 0.01% to about 0.08%, preferably from about 0.03% to about 0.06% by weight, based on the total weight of the activator composition, of sodium salicylate and from about 0.01% to about 0.08%, preferably from about 0.03% to about 0.06%, by weight, same basis, of sodium 5-bromosalicylate, the ratio of sodium salicylate to sodium 5-bromosalicylate ranging from about 9:1 to about 1:9, respectively, preferably 7:3-3:7, respectively.

Useful solvents for the catalyst components of the activator composition are well known in the art and can comprise any of those set forth in any one or more of the following U.S. Pat. Nos. 3,749,679; 3,391,068; 3,391,069; 3,974,368; 3,816,316; 3,557,233; 3,597,362; 3,775,336; 3,888,786, which patents are incorporated herein by reference.

Preferred solvents are esters, aromatic hydrocarbons and chlorinated hydrocarbons. Most preferred are the dialkyl phthalates wherein the alkyl group contains 1–12 carbon atoms, inclusive. Dimethyl phthalate is exemplary. Mixture of dimethyl phthalate and t-butyl alcohol are even more preferred.

The novel oxalate compositions of the present invention which are adapted to produce chemiluminescent light of high light intensity and short duration when admixed with the novel activator compositions hereof comprise a solvent solution of a mixture of from about 5% to about 15%, by weight, based on the total weight of the oxalate composition, of an oxalate and from about 1.6% to about 0.36%, by weight, same basis, of a fluorescer, preferably from about 0.20% to about 0.32%.

Any of the above-disclosed solvents may also be used as the solvent for the oxalate solution. Dibutyl phthalate is preferred. Any oxalate known in the art may be used such as those disclosed in U.S. Pat. Nos. 3,749,679 and 3,816,316. Substituted carbalkoxyphenyl oxalates are preferred and bis(2,4,5-trichloro-6-carbopentoxyphenyl)oxalate is most preferred.

The fluorescers useful in the oxalate ($B^1$) The oxalate composition of Example 1 contains:
  88.625%—dibutyl phthalate
  11,113%—bis(2,4,5-trichloro-6-carbopentoxyphenyl)oxalate (CPPO)
  0.262%—1-chloro-9,10-bis(phenylethynyl)anthracene. (CBPEA)

($A^2$) The activator composition of Example 2 contains:
  Same as Example 1.

($B^2$) The oxalate composition of Example 2 contains:
  Same as Example 1, except that CBPEA replaced by rubrene.

($A^3$) The activator composition of Example 3 contains:
  82.04%—dimethyl phthalate
  12.64%—t-butyl alcohol
  5.24%—90% $H_2O_2$
  0.04%—sodium salicylate
  0.04%—sodium 5-bromosalicylate ($B^3$) The oxalate composition of Example 3 contains:
  91.14%—dibutyl phthalate
  8.60%—CPPO
  0.26%—rubrene Compositions of the present invention are well known in the art and any such fluorescer may be employed. Exemplary fluorescers include rubrene, i.e., 5,6,11,12-tetraphenylnaphthalene; 9,10-diphenylanthracene; 1-chloro-9,10-bis(phenylethynyl)anthracene; 9,10-bis(phenylethynl)anthracene; 9,10-bis(4-methoxyphenyl)-2-chloroanthrace, alone or especially in admixture with $N,N^1$-bis(2,5-di-t-butylphenyl)-3,4,9,10-perylenedicarboximide; mixtures of the above fluorescers, and the like.

The following examples are set forth for purposes of illustration only and are not to be construed as limitations on the present invention except as set forth in the appended claims. All parts and percentages are by weight unless otherwise specified.

EXAMPLES 1-5

In the following examples, all measurements are made using conventional six (6) inch lightsticks containing a glass ampule of the activator composition floating in the oxalate composition the structure of which is known in the art.

In Table I, the light output (LOP) in foot lambert units is given for compositions of the present invention (Examples 3,4 and 5) in comparison to a standard red lightstick known in the art (Example 1) and a lightstick containing rubrene in the oxalate component and a standard activator solution (Example 2).

TABLE II

| Time (Min.) | Example 1 | Example 2 | Example 3 | Example 4 | Example 5 |
|---|---|---|---|---|---|
| On Activation | 176 | 305 | 4970 | 2765 | 1464 |
| 1 | 18 | 38 | 291 | 266 | 234 |
| 2 | 15 | 29 | 237 | 254 | 226 |
| 3 | 14 | 25 | 228 | 255 | 224 |
| 4 | 13 | 23 | 227 | 258 | 229 |
| 5 | 13 | 21 | 232 | 260 | 224 |
| 6 | 12 | 21 | 291 | 254 | 224 |
| 7 | 12 | 20 | 253 | 246 | 221 |
| 8 | 12 | 19 | 248 | 226 | 214 |
| 9 | 12 | 19 | 223 | 212 | 208 |
| 10 | 12 | 18 | 184 | 186 | 206 |
| 11 | — | 18 | 137 | 154 | 196 |
| 12 | — | 18 | 88 | 126 | 188 |
| 13 | — | 17 | 52 | 98 | 184 |
| 14 | — | 17 | 28 | 72 | 181 |
| 15 | — | 16 | 14 | 52 | 172 |
| 16 | — | — | 7 | 24 | — |

($A^1$) The activator composition of Example 1 contains:
  81.445%—dimethylphthalate
  13.319%—t-butyl alcohol
  5.227%—90% $H_2O_2$
  0.009%—sodium salicylate ($A^4$) The activator compositions of Example 4 contains:
  Same as Example 3.

($B^4$) The oxalate composition of Example 4 contains:
  Same as Example 3 except the rubrene is replaced by a mixture of 10% rubrene and 90% CBPEA.

($A^5$) The activator composition of Example 5 contains:
  Same as Example 3.

($B^5$) The oxalate composition of Example 5 contains:
  Same as Example 3 except that rubrene replaced by CBPEA.

EXAMPLE 6

When the procedure of Example 5 is again followed except that the CBPEA is replaced by 9,10-bis(phenylethynyl)anthracene (BPEA), similar results are achieved.

EXAMPLE 7

Replacement of the CBPEA of Example 5 by diphenyl anthracene achieves similar results.

EXAMPLE 8

The procedure of Example 3 is again followed except that the ratio of sodium salicylate to sodium 5-bromosalicylate is 9:1, respectively. Again a high light output of short duration is effected.

EXAMPLE 9

Following the procedure of Example 8 except that the catalyst ratio is 1:9, respectively, equivalent results accrue.

I claim:

1. An activator composition adapted to produce a chemiluminescent light of high light output for a short duration when admixed with an oxalate solution comprising a mixture of from about 5% to about 15%, by weight, based on the weight of the oxalate solution, of an oxalate and from about 0.16% to about 0.36%, by weight, same basis, of a fluorescer, comprising a solution of hydrogen peroxide and a mixture of from about 0.01% to about 0.08%, by weight, based on the total weight of said composition, of sodium salicylate and from about 0.01% to about 0.08%, by weight, same basis, of sodium 5-bromosalicylate, the ratio of sodium salicylate to sodium 5-bromosalicylate ranging from about 9:1 to about 1:9 respectively.

2. The composition of claim 1 wherein the concentration of sodium salicylate ranges from about 0.03% to about 0.06%, by weight, and the concentration of sodium 5-bromosalicylate ranges from about 0.03% to about 0.06%, by weight.

3. An oxalate composition adapted to produce a chemiluminescent light of high light output for a short duration when admixed with an activator solution comprising hydrogen peroxide and a mixture of from about 0.01% to about 0.08%, by weight, based on the weight of said solution, of sodium salicylate and from about 0.01% to about 0.08%, by weight, same basis, of sodium 5-bromosalicylate, the ratio of sodium salicylate to sodium 5-bromosalicylate ranging from about 9:1 to about 1:9, respectively, comprising a solution of a mixture of from about 5% to about 15%, by weight, based on the weight of said composition, of an oxalate and from about 0.16% to about 0.36%, by weight, same basis, of a fluorescer.

4. A composition according to claim 3 wherein said fluorescer is rubrene.

5. A composition according to claim 3 wherein said fluorescer is a mixture of rubrene and 1-chloro-9,10-bis(phenylethynyl)anthracene.

6. A composition according to claim 3 wherein said fluorescer is 9,10-bis(phenylethynyl)anthracene.

7. A composition according to claim 3 wherein said fluorescer is a mixture of diphenyl anthracene and a soluble perylene dye.

8. A composition according to claim 3 wherein said oxalate is bis(2,4,5-trichloro-6-carbopentoxyphenyl)oxalate.

9. A method for the production of chemiluminescent light of high light output and short duration which comprises adding to an oxalate solution comprising a mixture of from about 5% to about 15%, by weight, based on the weight of the oxalate solution, of an oxalate and from about 0.16% to about 0.36%, by weight, same basis, of a fluorescer, an activator composition comprising a solution of hydrogen peroxide and a mixture of from about 0.01% to about 0.08%, by weight, based on the total weight of the composition, of sodium salicylate and from about 0.01% to about 0.08%, by weight, same basis, of sodium 5-bromosalicylate, the ratio of sodium salicylate to sodium 5-bromosalicylate ranging from about 9:1 to about 1:9, respectively.

10. A method according to claim 9 wherein the concentration of sodium salicylate ranges from about 0.03% to about 0.06%, by weight, and the concentration of sodium 5-bromosalicylate ranges from about 0.03% to about 0.06%, by weight.

11. A method according to claim 10 wherein said fluorescer is rubrene.

12. A method according to claim 10 wherein said fluorescer is a mixture of rubrene and 1-chloro-9,10-bis(phenylethynyl)anthracene.

13. A method according to claim 10 wherein said fluorescer is 9,10-bis(phenylethynyl)anthracene.

14. A method according to claim 10 wherein said fluorescer is a mixture of 9,10-diphenylanthracene and a soluble perylene dye.

15. A method according to claim 10 wherein said oxalate is bis(2,4,5-trichloro-6-carbopentoxyphenyl)oxalate.

* * * * *